United States Patent [19]

Ottaviano

[11] 4,412,879

[45] Nov. 1, 1983

[54] CUSHIONING DUNNAGE APPARATUS AND METHOD

[75] Inventor: Gary W. Ottaviano, Bedford Heights, Ohio

[73] Assignee: Ranpak Corp., Willoughby, Ohio

[21] Appl. No.: 317,505

[22] Filed: Nov. 2, 1981

[51] Int. Cl.³ .................... B32B 31/12; B32B 3/28
[52] U.S. Cl. ................... 156/145; 156/209; 156/210; 156/285; 156/292; 156/308.4; 156/309.9; 156/322; 156/324; 428/166; 428/172; 428/178; 156/443; 156/499; 156/553
[58] Field of Search ............... 156/77, 145, 209, 210, 156/285, 292, 308.4, 309.9, 322, 324, 499, 443, 553; 428/166, 172, 178, 72

[56] References Cited

U.S. PATENT DOCUMENTS

| | | | |
|---|---|---|---|
| 3,018,015 | 1/1962 | Agriss et al. | 217/53 |
| 3,142,599 | 7/1964 | Chavannes | 156/210 |
| 3,231,454 | 1/1966 | Williams | 428/132 |
| 3,285,793 | 11/1966 | Chavannes | 156/210 |
| 3,349,990 | 10/1967 | Woodford | 229/55 |
| 3,389,534 | 6/1968 | Pendleton | 53/180 |
| 3,392,081 | 7/1968 | Chavannes | 428/175 |
| 3,416,984 | 12/1968 | Chavannes et al. | 156/145 |
| 3,523,055 | 8/1970 | Lemelson | 428/72 |
| 3,575,781 | 4/1971 | Pezely | 428/180 |
| 3,577,305 | 5/1971 | Hinos et al. | 428/72 |
| 3,616,155 | 10/1971 | Chavannes | 428/159 |
| 3,785,899 | 1/1974 | Fielding | 156/209 |
| 3,817,803 | 6/1974 | Horsky | 156/85 |
| 3,837,990 | 9/1974 | McConnell et al. | 428/118 |
| 3,837,991 | 9/1974 | Evans | 428/118 |
| 3,868,056 | 2/1975 | Keren | 229/55 |
| 4,076,872 | 2/1978 | Lewicki et al. | 428/178 |
| 4,096,306 | 6/1978 | Larson | 428/178 |
| 4,314,865 | 2/1982 | Ottaviano | 156/145 |

Primary Examiner—Robert A. Dawson
Attorney, Agent, or Firm—Baldwin, Egan, Walling & Fetzer

[57] ABSTRACT

A method and apparatus for the production of thermoplastic film air cell cushioning product. The method and apparatus utilize as stock material flexible thermoplastic film formed of a composite of a stratum of relatively high density, high melting point thermoplastic and another stratum of relatively low density, low melting point thermoplastic bonded to the first mentioned stratum. A sheet of the composite thermoplastic film material is heated well above the melting point of the low melting point stratum but below the melting point of the high density stratum and is applied to a rotating forming drum and vacuum formed, to produce the air cells in the product, and then a sheet of the film material which has been heated, is generally immediately laminated to the heated sheet on the drum, with the temperature of the second mentioned sheet being at its application to the embossed sheet, below the melting point temperature of the low density stratum and at a maximum temperature approximating the mean temperature between the heat softening point and the Vicat softening point of the low density stratum, with the second mentioned sheet being applied with associated pressure to the heated embossed first sheet on the rotating forming drum. The apparatus is relatively compact and the method and apparatus are energy efficient.

30 Claims, 7 Drawing Figures

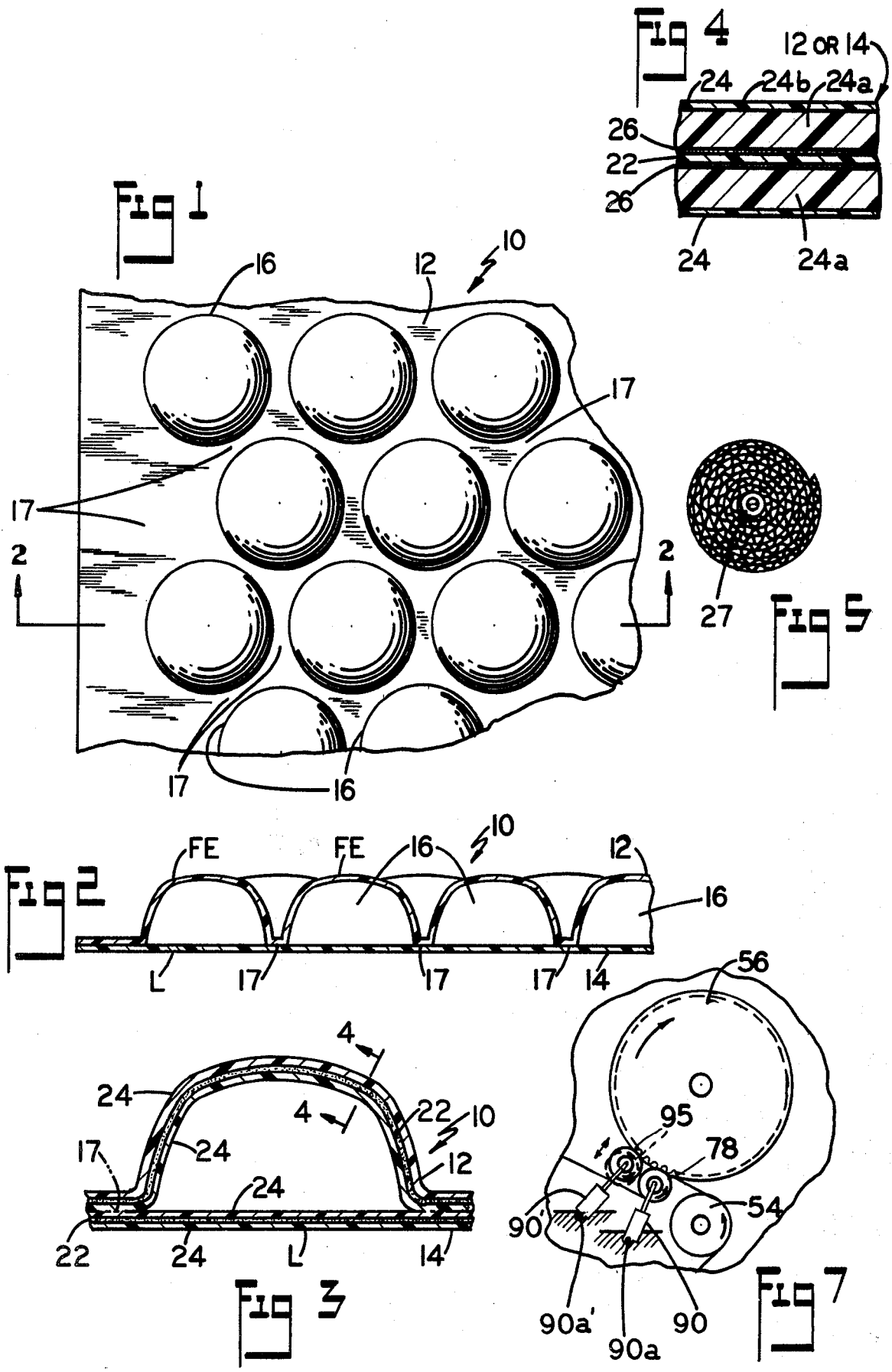

CUSHIONING DUNNAGE APPARATUS AND METHOD

This invention relates to a novel method and apparatus for the production of air cell cushioning material formed of flexible thermoplastic sheet or film, and more particularly relates to an apparatus and associated method which is particularly energy efficient and which is of generally compact nature, including an apparatus having the capability of providing for the interruption of the production operation and without affecting the workability of the apparatus and/or method when production of the air cell product is reinitiated after termination of the interruption, and which results in a quality air cell thermoplastic film product of high strength, possessing the ability to retain its originally formed thickness over a relatively long period of time and under load.

BACKGROUND OF THE INVENTION

It is well known in the prior art to produce air cell cushioning product on a rotating forming drum utilizing flexible thermoplastic sheet material by embossing one of the sheets on the drum and then applying a laminating or cover sheet thereto for sealing formation of the air cells, with such air cell product being utilized for instance in cushioning applications. See for instance U.S. Pat. Nos. 3,142,599; 3,285,793 and 3,416,984. Such prior art methods and apparatus usually comprise heating not only the film to be embossed to a high temperature either substantially at or above the fusion temperature of the film material, but also heating the laminating film to a temperature at about the fusion temperature prior to application of the laminating sheet to the heated embossed sheet. Such prior art arrangements are not only relatively energy inefficient, resulting in increased production costs, but also involve more expensive arrangements for the apparatus and the controls therefor, resulting in greater relative overall costs.

In applicant's copending U.S. patent application Ser. No. 75,662, filed Sept. 14, 1979 and entitled "Cushioning Dunnage Product, Apparatus and Method" there is disclosed a method and an apparatus for producing air cell cushioning dunnage which includes a cooling step for cooling the product on the rotating forming drum to a particular temperature prior to application of the laminating sheet to the embossed sheet on the drum, and which results in an air cell product having some of the same general characteristics as those of the product with the present apparatus and method. In certain other respects however, the produced products are different.

Moreover, there are considerable other prior art patents in the air cell cushioning dunnage field, such as for instance U.S. Pat. Nos. 3,018,015; 3,231,454; 3,349,990; 3,577,305 3,586,565; 3,389,534; 3,523,055; 3,575,781; 3,616,155; 3,785,899; 3,817,803; 3,837,990; 3,837,991; 3,868,056; 4,076,872; 4,096,306; and 3,771,388, and the Australian Pat. No. 160,551. The above are merely representative, and it is not meant to imply that such a list is all inclusive.

These prior art methods and apparatus are not generally of the type which can be readily and conveniently interrupted in operation and then restarted, without having considerable undesirable effects upon the resultant product, or on the film stock material utilized to produce the product, and/or on the mechanism or apparatus per se. Moreover, such prior art mechanisms if they do possess the ability to be interrupted in operation, are generally of a rather complex, non-compact nature, and which generally utilize considerable energy in the formation of their respective thermoplastic air cell products.

SUMMARY OF THE INVENTION

The present invention provides a novel method and a relatively compact apparatus for the production of flexible thermoplastic film, air cell material which has relatively high strength and high resistance to loss of air from the cells, and a method and apparatus which are energy efficient and provide for expeditious production of the air cell product, and wherein the compact apparatus can be conveniently interrupted in its production operation of the air cell product without material harmful effects on the thermoplastic film stock utilized in the apparatus, and/or on the method utilized in the production of the air cell product.

Accordingly, an object of the invention is to provide a novel method for the production of flexible thermoplastic film air cell product for use, for instance, in protective packaging applications.

Another object of the invention is to provide a novel energy efficient apparatus for the production of flexible thermoplastic film air cell material and one wherein the apparatus is of a relatively compact nature and can be selectively interrupted in its production process without harmful effects on the film stock material utilized to produce the product, or on the associated apparatus, or on the resultant air cell product.

A still further object of the invention is to provide a novel method of producing flexible thermoplastic film air cell cushioning material, and which is energy efficient, and will provide an air cell product in which the films of thermoplastic forming the product, are efficiently heat bonded together.

A still further object of the invention is to provide a novel apparatus of compact nature for the production of flexible thermoplastic film air cell cushioning material and one which is energy efficient in utilizing lower temperatures as compared to those previously thought possible for the film material, while still effectively providing for the heat bonding of the films together.

Other objects and advantages of the invention will be apparent from the following description taken in conjunction with the accompanying drawings wherein:

BRIEF DESCRIPTION OF THE DRAWINGS

FIG. 1 is a top plan, fragmentary view of a section of a strip or sheet of the air cell cushioning material product produced by the present method and apparatus;

FIG. 2 is a sectional view taken generally along the plane of 2—2 of FIG. 1, looking in the direction of the arrows;

FIG. 3 is an enlarged, vertical sectional view of one of the air cells of the produced product showing the stratums of defining layers of the thermoplastic film or sheet utilized to produce the product;

FIG. 4 is a further enlarged, vertical sectional view taken through one of the flexible thermoplastic film sheets utilized in the production of the product, illustrating the layers or stratums of plastic materials utilized in the film of thermoplastic stock material;

FIG. 6 is a side elevational generally diagrammatic view of an apparatus utilizable in performing the method of the invention;

FIG. 7 is a fragmentary illustration of another embodiment of apparatus, including a forming drum, for producing flexible thermoplastic film air cell cushioning material.

DESCRIPTION OF PREFERRED EMBODIMENTS

Figure 5:
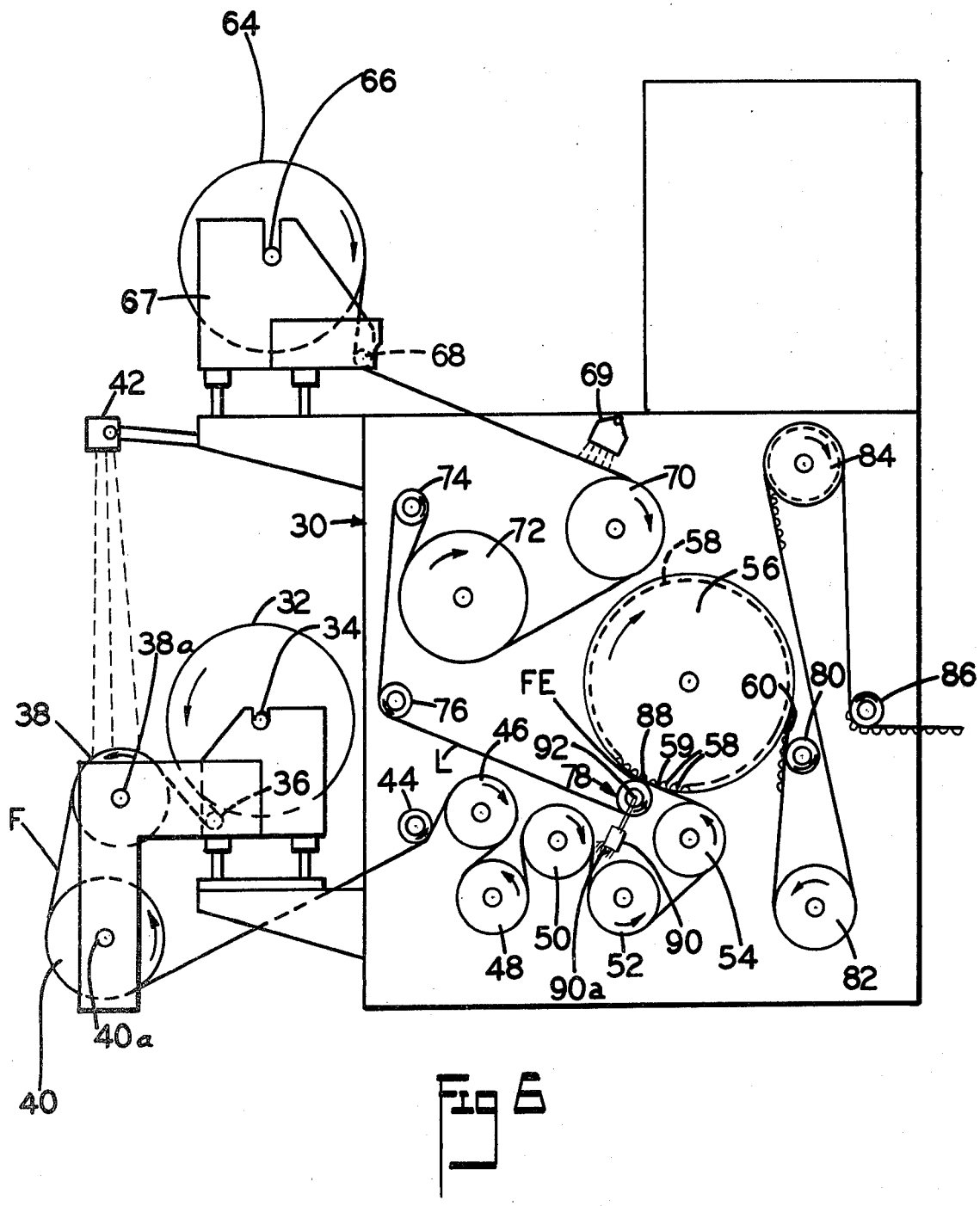
FIG. 5 is a diagrammatic, end elevational view showing a strip of the sheeting product produced on the apparatus and/or utilizing the method of the invention, and as rolled into generally cylindrical form for ready use, or transportation and/or storage.

Referring now again to FIGS. 1-4, there is illustrated an air cell cushioning product 10 producible from the method and apparatus of the present invention. The product is formed of two sheets of films 12 and 14 (FIGS. 2 and 3) of flexible thermoplastic material, with one of the sheets (i.e. 12) having been heat-embossed to define relatively closely spaced cells 16, which are adapted to contain air entrapped therein by the laminating or cover sheet 14. Sheets 12 and 14 are heat sealed to one another at spaced areas 17 (FIG. 2). Each of the air cells may be of the general dome shaped configuration shown, and in view of being filled with air, provide the cushioning effect when the product is utilized for instance in packaging an item, so as to cushion the item from vibration and/or shock damage. It will be understood, however, that various heights and diameters and geometric shapes of cells may be provided with the cells being preferably either generally dome shaped as shown or they may be more flat on the top, or more rounded on the top than is illustrated in the example of the air cell product. The configuration of the recesses in the forming drum of the apparatus on which the product is produced will determine, in general, the exterior configuration of the cells.

Referring now to FIGS. 3 and 4, each of the sheets 12 and 14 used in the formation of the air cell product may be and preferably is formed of an inner stratum 22 of flexible nylon and outer stratums 24 of polyethylene. The sheet of thermoplastic film is preferably made by the known cast coextrusion method, with the intermediate nylon stratum being of a relatively high density relatively high melting point (e.g. 490° F.) material substantially impervious to the passage of gases therethrough, while the polyethylene stratums are formed of relatively low density polyethylene plastic, having a relatively low melting point (e.g. 230° F.). The nylon content can be 10%, 20% or 30% of the overall thickness of the film structure, and the exterior polyethylene layers 24 generally equally provide the balance of the thickness of the sheet film material. The overall thickness of the sheet may vary say for instance from 1 or 1.5 mils, to approximately 8 mils, but it is preferable that for use as a cushioning dunnage product, the embossed or domed sheet 12 be between approximately 2 to 8 mils in overall thickness, while the laminating or cover sheet 14 be approximately 1 or 1.5, to 4 mils in thickness, and preferably being of a lesser thickness as compared to the overall thickness of the embossed sheet 12, but at least being of no greater thickness.

The stock sheet of film preferably utilized, has an impact strength of from approximately 300 to 310 grams, and a tensile strength in pounds per square inch of from 3400 to approximately 6200, which depends in general on the percentage of nylon in the sheet. A sheet with a higher percentage of nylon, such as for instance 30% nylon, has the greater tensile strength. The exterior polyethylene stratums of the sheet will commence to become somewhat "soft" at approximately 160° F. (known as the softening point) and represents the temperature at which the low melting point low density stratum commences to change from a crystalline structure to an amorphous structure. Such low density stratum also has a Vicat softening point of approximately 206°-210° F. which is the temperature at which the stratum becomes too soft to withstand stresses and keep its shape, and more particularly is the temperature at which a flat ended needle of one sq. mm cross section under a load of one kg. will penetrate one mm into the stratum. As aforementioned, stratum 24 will melt at approximately 230° F.

In the sheet stock material illustrated, the nylon layer 22 is bonded to the exterior heat sealable layers 24 by a binder coating 26, the thickness of each of which in the embodiment shown represents about 5% of the overall thickness of the sheet stock. Moreover, each of the exterior polyethylene layers 24 preferably comprises an inner section 24a of a combined low density virgin and recycled polyethylene and a relatively thin (e.g. 5% of the overall sheet thickness) outer section 24b of low density virgin polyethylene bonded together. The thickness of the intermediate stratum 22 is less than one third the overall thickness of the plastic sheet, and preferably is less than one third the thickness of each of the exterior stratums 24.

This multi-layer composite plastic sheet utilized in the production of the cushioning dunnage product is available in commercial form from the Crown Zellerback Corporation of Texas, and two preferable types are identified by it as "Crown Zellon 305" composite film and "Crown Zellon 355" composite film.

FIG. 5 illustrates a roll of the embossed cushioning dunnage product as produced on the machine of FIG. 6, and disposed or rotated into roll form about a hollow core 27. The cushioning product utilizing the aforedescribed stock film provides gas barrier characteristics rated at no greater than approximately 10 to 12 c.c. per 100 square inches per 24 hours at one atmosphere at 72° F.

FIG. 6 illustrates diagrammatically, an apparatus for producing the cushioning product of FIGS. 1-3 and 5. In the embodiment illustrated, the apparatus comprises a frame 30 on which may be rotatably mounted a supply roll 32 of the polyethylene-nylon-polyethylene flexible plastic sheet or film material F, for rotation about a generally horizontal axis 34. The stock sheet material F is pulled off roll 32 and passes about a preferably stationary, generally horizontally oriented shaft 36 which is preferably coacted with a layer of some friction reducing anti-adhesion material, such as for instance polytetraflourethylene, otherwise known as "Teflon."

The sheet passes beneath shaft 36 and then passes over a roller 38 which is preferably driven at a peripheral speed slightly less (e.g. 49.5 feet per minute) than the film F speed (e.g. 51 feet per minute) and about its axis 38a on frame 30. Roller 38 should be maintained rotatable and moveable with the film F at a surface speed at least not to exceed the speed of travel of the film. Roller 38 is preferably coated with a friction reducing anti-adhesion coating and is able to be heated to a temperature of between approximately 130° to 190° F. by any suitable means, such as for instance, by thermostatic controlled electric heating means of known type, embodied therein. Passage of the plastic sheet F around the heated roller 38 causes it to be pre-heated to a temperature approaching that within the heat range of the heater roller of approximately 130° to 190° F.

The web of sheet material F then passes down around roller 40 (which is preferably driven so as to have a surface speed the same as roller 38) and which again is heated preferably to a temperature range of between approximately 130°-190° F. Roller 40 should be maintained rotatable and moveable with the film F at a surface speed the same as that of roller 38, and at least not to exceed the speed of travel of the film. Heated rollers 38, 40 also enhance drying of any applied anti-static material which may be applied by spray head 42 in the conventional manner. Roller 40, is, as illustrated, preferably of a larger diameter as compared to roller 38 and is rotatable about axis 40a on framework 30, in a generally similar manner as roller 38. Roller 40 is preferably surface coacted with friction reducing anti-adhesion material in a similar manner as roller 38.

From roller 40, the web of plastic sheet moves about preferably non-heated idler roller 44 which again is preferably surface coated with a layer of anti-sticking material, such as the aforementioned "Teflon." The sheet F may be traveling at a rate of approximately 51 feet per minute as aforementioned.

From idler roller 44, the sheet passes about relatively closely spaced rollers 46, 48, 50, 52, and 54, all of which are heated, and all of which preferably have an exterior surface coating thereon of friction reducing anti-adhesion material, such as the aforementioned "Teflon." Roller 46 is preferably at a surface temperature of between approximately 205°-300° F. Rollers 48 and 50 are each preferably at a temperature of between approximately 280°-330° F. Rollers 52 and 54 are each preferably at a surface temperature of approximately 330° F.

All of the rollers 46, 48, 50, 52 and 54 are power driven, are of approximately the same size, and are driven at the same speed, and in the embodiment illustrated at a speed to impart a speed of approximately 51 feet per minute to the strip or web of film F. As the web of plastic sheet or film material passes about these rollers, the temperature of the thermoplastic sheet is raised to a temperature of approximately 330° F., and the polyethylene stratums 24 thereof are melted and turned into substantially liquid form as carried by the nylon intermediate stratum 22 of the sheet.

From roller 54, the heated sheet material is generally immediately applied to the rotatably driven embossing drum 56, various types of which are known in the art. Embossment of the plastic film or sheet on the embossing drum 56 is preferably accomplished by a vacuum means (e.g. producing a vacuum of 3-7 inches of mercury) communicating with each individual depression 58, located on the surface of the embossing drum. The depressions 58 are conventionally connected by passages connecting with a vacuum manifold in the embossing drum 56 and coupled to a controlled source of vacuum. The forming drum may be conveniently made of aluminum, with the surface thereof being preferably coated with a layer of adhesion preventing material, such as the aforementioned "Teflon," so that the preheated plastic sheet will not adversely adhere to the surface of the forming drum 56 during the embossing operation. Although FIG. 6 of the drawings shows diagrammatically a generally dome shaped defining surface of the depressions 58, as well as a generally dome shaped exterior surface on the finished air cell cushioning product (as shown in FIG. 2), it will be understood that the size, configuration and distribution of the embossments may be modified as desired so as to provide for different purposes and/or requirements. However, the generally dome shaped configuration illustrated is preferred for the embossed air cell.

The drum is preferably maintained at a maximum surface temperature of between approximately 125°-130° F. Any suitable means can be utilized to maintain the temperature of the drum 56, with an internal electrical heater and fan being one suitable means. The drum 56 cools the formed air cell product thereon, as will be hereinafter described.

It will be seen from FIG. 6 that in the embodiment illustrated, the pre-heated plastic sheet of film F is preferably applied to the rotating forming drum 56 generally adjacent the latter's lowermost position, and is embossed as the drum rotates. At approximately the same point on the drum as the initial point of application 59 of the first sheet F, to the embossing drum 56 but subsequent to the embossment of the sheet F, a laminating or cover sheet L is applied. Accordingly, since the embossing drum is preferably at a maximum temperature of between approximately 125°-130° F., and the embossed sheet FE is at a much higher temperature (e.g. 330° F.) cooling of the embossed sheet FE and the heat bonded laminating sheet L on the drum occurs as the drum rotates from position point 59 where the sheet F (and then the sheet L) are first applied thereto, to the position 60 where the formed air cell product is stripped from the forming drum. Accordingly, the embossed sheet FE of the produced air cell product at point 60 preferably is at a maximum temperature of approximately 125°-130° F., the drum having cooled the formed plastic air cell product down to this temperature which is well below the melting temperature of the polyethylene exterior layers 24, as well as to a temperature well below the aforementioned heat softening point (e.g. approximately 160° F.) of the exterior layers or stratums of the film.

The supply of laminating sheet L is preferably mounted on a roll 64 rotatable mounted about an axis 66 on upper frame 67 of the apparatus. Sheet L may be a multi-stratum structure similarly to that aforedescribed for embossing sheet F, and generally similar to that shown in FIG. 4 of the application drawings. However, it will be understood that the thickness of laminating sheet L is preferably thinner than the thickness of embossing sheet F. In this connection, if the embossing sheet F is 2 mils in thickness, the laminating sheet L will be preferably 1 or 1.5 mil thickness.

From roll 64, the laminating sheet is pulled off to pass around preferably non-rotatable, rod 68 and then downwardly into interior of machine frame 30, to pass onto heated preferably driven rotatable roller 70 which is preferably heated to a surface temperature within a range of approximately 130° to 190° F. Roller 70 should be maintained at a minimum temperature of 130° F. and is moveable with film L, and at a surface speed at least one to exceed the speed of travel of the film L, and preferably at a peripheral speed slightly less than the film L speed (e.g. 49.5 feet per minute), to aid in prevention of wrinkling in film L.

From roller 70, the laminating sheet L which is preferably traveling at a speed of between approximately 49.5 to 52 feet per minute passes around increased diameter roller 72 which is preferably heated to a temperature within a range of approximately 160°-190° F., with roller 72 likewise being preferably driven at a peripheral speed slightly less than the speed of the film L (e.g. 49.5 ft/min). Roller 72 is maintained at least at a minimum surface temperature of approximately 160° F.

The laminating sheet L then passes about and engages non-heated, preferably idler rollers 74 and 76, which provide a drying path in the event that anti-static material has been applied to web L, as for instance by means of spray head 69. Rollers 70, 72, 74 and 76 as well as aforementioned rod 68 are preferably coacted with a layer of anti-sticking material, such as Teflon, in a similar arrangement and for the same purpose as the other coated rollers.

From idler roller 76, the laminating sheet passes about a heated non-power driven, pressure roller 78 which is at a surface temperature within a range of approximately 180°–195° F., thus insuring that the roller 78 not cause or permit any rapid migration of heat thru or from the laminating film L in the direction of the roller 78. Thus the temperature of the laminating film L as the latter passes about a substantial extent of the circumference of roller 78, is at least maintained, and the heat in the embossed film FE migrating to the confronting stratum of the laminating film L is generally concentrated or slowed in its migration movement, at the engaged boundry between the two films FE and L, and does not rapidly escape or move toward or in the direction of the pressure roller 78. Roller 78 is driven by its engagement with the rotatable driven forming drum 56, and is able to be heated by any suitable means, such as by an internal electrical heating element, to a maximum surface temperature of approximately 195°, and preferably is maintained at a surface temperature of approximately 185° F. It will be understood therefore that the web or sheet L at its application to the embossed sheet FE on the forming drum, will be at a temperature within the range of approximately 180°–195° F., and preferably is at a temperature of approximately 185° F. for optimum result in the production of the air cell cushioning product, together with resultant energy conservation. The temperature of the laminating sheet L at its application to the embossed film is thus well below the melting temperature of the polyethylene exterior layers 24 of the laminating sheet L, and at a temperature approximating the mean temperature between the heat softening point and the Vicat softening point of the exterior stratum 24.

Rotatable roller 78 is urged toward forming drum 56, and thus the laminating sheet L is applied under pressure to the confronting surface of the hot (e.g. 330° F.) polyethylene layer on the embossed sheet on the drum, and due to the migration of heat from the embossed film to the cooler laminating film results in an increase of the temperature of the surface of the confronting polyethylene layer 24 on the laminating film and a sufficient softening thereof, and together with the pressure applied by roller 78, providing for a secure bond between the laminating and embossed films or sheets L and FE, to seal the air cells, as illustrated in FIGS. 2 and 3.

It will thus be understood that the hot embossed sheet FE raises the overlaid cooler laminating sheet L from a temperature within a range of approximately 180° to 195°, and preferably from a temperature of approximately 185° F., to a temperature which causes sufficient softening of the surface of layer 24 of sheet L confronting the hot embossed sheet FE, that together with pressure as applied by roller 78, causes a bonding together of externally facing melted layer 24 of the embossed sheet FE and the adjacent confronting heat softening layer 24 of the laminating sheet. It is believed that the underlying non-virgin polyethylene layer 24a of the laminating sheet does not melt, with substantially only the exterior surface of layer 24b of the laminating sheet being melted, and due to heat transfer thereto from the hot (e.g. 330° F.) embossed sheet FE.

The heat and pressure bonded cushioning dunnage product is then moved and cooled by the rotating forming drum from the point of pressurized engagement of the laminating sheet with the embossed sheet, to point 60 where the anti-stick coated, non-driven roller 80, which preferably is at a temperature within the range of approximately 35°–65° F. strips off the formed air cell product from the forming drum 56. Since the forming drum 56 is at a maximum temperature of approximately 125°–130° F. the bond between the sheet L and FE is fully set by time the air cell cushioning product is stripped from the forming drum.

The produced air cell product may then be directed about increased diameter preferably driven roller 82, preferably driven roller 84 and preferably non-driven roller 86 all of which may be cooled to a temperature range of for instance 35° to 65° F., to further cool the produced air cell product. From roller 86, the continuous strip of air cell product can be directed to an accumulator (not shown) where the product can be readily disposed in roller form as shown for instance in FIG. 5. Rollers 82 and 84 and the accumulator are driven at the same surface speed as drum 56. Rollers 80–86 are preferably coacted with "Teflon" or the like. A cutter unit of any suitable type may be provided for severing an accumulated roll of air cell product from the producing apparatus.

The driven peripheral speed of the forming drum 56 is preferably slightly greater than the peripheral speed of the driven rollers 46–56 controlling the speed of web of sheet material F. Thus drum 56 preferably has a peripheral speed of for instance approximately 53 feet per minute as compared to the speed of approximately 51 feet per minute for rollers 46–54 and the speed of approximately 49.5 feet per minute for rollers 70 and 72. Such a differential in speeds helps to prevent wrinkles on the formed product and aids in controlling the position of the webs or sheets on the forming drum.

From roller 54, the laminating sheet is directed toward the periphery of the embossing or forming drum 56 where the aforedescribed pressure engagement of the laminating sheet L with the exterior or confronting surface of the embossed sheet FE is accomplished at line location 88 by means of the aforementioned rotatable pressure roller 78. Roller 78 (which may be referred to as a nip roller) preferably includes a resilient layer of, for instance, silicone rubber, which in turn is "Teflon" coated, and with the roller being urged toward engagement with the forming drum 56, as by means of a pair of spaced, single acting air cylinders 90, one being disposed adjacent each end of the axle 92 of the nip roller 78, and coacting therewith so as to direct the nip roller toward pressurized, generally lineal engagement with the forming drum upon actuation of motor units 90.

Motor units 90 are preferably pivoted as at 90a to a support portion of the apparatus frame thus providing for limited pivotal movement of the motor units 90 with respect to the supporting frame. Motor units 90 preferably provide a total pressure to the laminating film of approximately 6 pounds force per lineal inch of transverse contact of roller 78 against the laminating sheet on the forming drum. Roller 78 is approximately the same length as drum 56, and in the embodiment illustrated is about 2 feet long. Accordingly, it will be seen that motor units 90 exert a total force of approximately 144 pounds (6 pounds/in.×24 inches). This pressure in conjunction with the aforementioned heat migrating from the embossed sheet of film, produces a positive and optimum heat seal between the laminating sheet and the embossed sheet. The generally line contact between pressure roller 78 and the laminating film is preferably disposed in a plane passing through the axis of rotation of the forming drum.

While the aforementioned approximately 6 pounds per lineal inch pressure is preferred for the applied pressure to the laminating film by roller 78, a pressure within the range of approximately 3 pounds to approximately 8 to 9 pounds per lineal inch will produce useful air cell cushioning dunnage product. A pressure of below approximately three pounds per lineal inch, in conjunction with the temperature specified, would not provide satisfactory air cell cushioning material for most packaging cushioning applications. A pressure more than the specified maximum of 8 to 9 pounds per lineal inch would or might cause damage to roller 78.

The cushioning dunnage product produced from the apparatus and method aforedescribed meets the Federal Specifications entitled Cushioning Material, Flexible Cellular, Plastic Film For Packaging Applications, of the Federal General Services Administration, and identified as PPP-C-795A dated Dec. 2, 1970.

Referring now to FIG. 7, there is illustrated a modified arrangement of the FIG. 6 apparatus. In this arrangement, a further pressure nip roller 95 is provided, downstream from nip roller 78. Such further nip roller 95 as illustrated, may be reciprocably movable to and from pressurized contact with drum 56, and as by means of double acting pivotal air units 90' disposed at opposite ends of its axle. Roller 95 is preferably heated to a temperature of about 185° F., but may be heated to a maximum temperature of the same extent as roller 78, but such auxiliary roller may have a lower minimum temperature at the other end of its range (e.g. 150° F.) and may be urged against the laminating film L with the same general pressure as aforedescribed for roller 78 (i.e. six pounds per lineal inch of contact with the drum). Use of such a further nip roller 95 may provide a somewhat stronger pressure bond between the embossed sheet FE and the laminating sheet L on the forming drum due to the extended time application of pressure via the auxiliary roller 95. In other respects, the FIG. 7 embodiment of apparatus may be generally similar to that of FIG. 6.

From the foregoing description and accompanying drawings it will be seen that the invention provides an energy efficient method, and a compact, energy efficient apparatus for the production of air cell cushioning product from multi-stratum thermoplastic sheet or film, and wherein the resultant product has substantial strength and the ability to generally retain its thickness under load; the laminating sheet in the production of the resultant product is heated to a temperature approximating the mean temperature between the heat softening point and the Vicat softening point of the low density, low melting point stratum of the laminating sheet, and is applied with associated pressure to the multi-stratum embossed sheet on the forming drum, in order to obtain effective bonding of the sheets at the areas of engagement therebetween.

The terms and expressions which have been used are used as terms of description and not of limitation, and there is no intention in the use of such terms and expressions of excluding any equivalents of any of the features shown or described, or portions thereof, and it is recognized that various modifications are possible within the scope of the invention claimed.

What is claimed is:

1. In an energy efficient method of manufacturing air cell cushioning material from a plurality of flexible thermoplastic film with each film comprising a composite of a stratum of high density high melting point thermoplastic material generally impervious to the passage of gas therethrough and at least one other stratum bonded to the first mentioned stratum, with the second mentioned stratum being formed of a low density low melting point thermoplastic, the last mentioned thermoplastic being of a lower density, lower melting point thermoplastic as compared to that of said first mentioned stratum, comprising the steps of heating a first of the composite films to a heated temperature above the melting point temperature of the second mentioned stratum but below the melting point temperature of the first mentioned stratum and to a temperature adequate for permitting thermoforming of said first film, embossing said heated first film by feeding it onto a rotating forming drum maintained at a predetermined temperature range and having a plurality of recesses therein, and forming from the first composite film the air cells in the recesses on said forming drum by vacuum, with said other stratum of said first film facing outwardly of the drum, heating a second composite film of the thermoplastic to a heated temperature below the melting point of said second mentioned stratum of said second film and to a maximum temperature approximating the mean temperature between the heat softening point and the Vicat softening point of said second mentioned stratum, applying said second film with said other stratum thereof facing said first film to said first film with associated pressure, while said first film is at about said heated temperature thereof, whereby the heat in said first film causes a softening of the confronting other stratum of the second film sufficiently in conjunction with said pressure to cause a bonding of said first and second films at the areas of engagement while on the drum so as to seal the air cells in the product, and then cooling the formed air cell product on the rotating drum to a temperature which is below said softening point of said other stratum so as to set the bond between said films.

2. A method in accordance with claim 1 wherein said first mentioned stratum is nylon, and said other stratum is low density polyethylene.

3. A method in accordance with claim 2 wherein said first film is heated to a temperature of approximately 330° F. just prior to its being applied to the forming drum, and the second film is heated to a mean temperature of approximately 185° F. just prior to its being applied to the embossed first film on the forming drum.

4. A method in accordance with claim 3 wherein the forming drum is maintained at a maximum temperature of approximately 125°-130° F. during application of said first and second films thereto in formation of said air cell product and removal of the latter from the drum.

5. A method in accordance with claim 3 wherein said pressure utilized on said second film to urge it into pressurized contact with the embossed film on the forming drum is via a roller applying a pressure of approximately 6 pounds per lineal inch of contact between the roller and said second film in a direction transversely of the latter.

6. A method in accordance with claim 1 wherein said second film is heated to a mean temperature within the range of 180° F. to 195° F. just prior to its being applied to the embossed first film on the forming drum.

7. A method in accordance with claim 1 wherein said cooling of the formed air cell product is accomplished on said rotating drum by maintaining the latter at a predetermined temperature substantially below the heated temperature of said second film and to a temperature which is below said softening point temperature of said other stratum, and then removing the formed cushioning air cell product from the forming drum.

8. A method in accordance with claim 3 wherein said pressure utilized on said second film to urge it into pressurized contact with the embossed film on the forming drum is via a roller applying a pressure within the range of approximately 3 to 9 pounds per lineal inch of contact between the roller and said second film in a direction transversely of the latter.

9. A method in accordance with claim 3 wherein said first film is progressively heated to a temperature of approximately 330° F. by a plurality of relatively closely spaced heated roller means of substantially the same size engaging the first film prior to application of the latter to the forming drum, and including the step of driving all of said roller means at substantially the same speed.

10. A method in accordance with claim 3 wherein said first and second films are progressively heated to said respective temperatures by a plurality of heated and rotatably powered roller means, and including the step of rotating said forming drum at a peripheral speed slightly greater than the peripheral speed of said roller means.

11. A method in accordance with claim 1 including interrupting the method by stopping rotation of said drum to terminate production of the cushioning product, and then subsequently restarting the method by restarting rotation of said drum and continuing with the production of the product without injurious effect to the method and/or produced product.

12. A method in accordance with claim 1 including the step of applying further pressure by second heated roller means to said films on said drum immediately subsequent to said pressurized application of said second film to said first film.

13. A method in accordance with claim 12 wherein said further pressure means is heatable to a maximum temperature of 195° F. and is maintained within a temperature range of from approximately 150° F. to said maximum temperature of 195° F.

14. A method in accordance with claim 1 including the step of applying anti-static material to at least one of said films prior to its being coacted with the other film on the forming drum.

15. A method in accordance with claim 3 wherein said first film is initially passed about a roller maintained at a temperature of approximately 130° to 190° F. and of a predetermined diameter, and then is passed around another roller maintained at a temperature in the range of approximately 130° to 190° F. with the second heated roller being of a greater diameter as compared to that of the first roller, and then is passed into engagement with a further roller which is non-heated, and then passing the first film about a group of consecutive relatively closely spaced driven rollers including a driven roller which is maintained at a surface temperature of between approximately 205° to 300° F., and then about a further driven roller which is maintained at a surface temperature between approximately 280° to 330° F. and then about a further driven roller which is maintained at a surface temperature of approximately 280° F.–330° F., and then about a further driven roller which is maintained at a surface temperature of approximately 330° F., and then about a further driven roller which is maintained at a surface temperature of approximately 330° F., and then is applied to the forming drum which is maintained at a maximum surface temperature of approximately 125° F. to 130° F., all of said driven rollers being of substantially the same diameter, and being driven at substantially the same speed.

16. A method in accordance with claim 3 wherein said first mentioned nylon stratum on both sides thereof is bonded to relatively low density polyethylene stratums having a melting point of approximately 230° F., the melting point of said first mentioned nylon stratum being approximately 490° F., said heat softening point being approximately 160° F. and said Vicat softening point being in the range of approximately 206°–210° F.

17. A method in accordance with claim 1 wherein the air cell product is stripped from the drum over 180 circumferential degrees from the point of application of said second film to said drum.

18. In an energy efficient apparatus for producing embossed air cell cushioning material from a plurality of flexible thermoplastic film stock, each film of which comprises a composite of a stratum of high density high melting point thermoplastic material generally impervious to the passage of gas therethrough and at least one other stratum bonded to the first mentioned stratum, with the second mentioned stratum being formed of a low density low melting point thermoplastic, the last mentioned thermoplastic being of a lower density, lower melting point thermoplastic as compared to that of said first mentioned stratum, said apparatus comprising, a rotatably driven forming drum having a plurality of recesses therein for vacuum forming the air cells in a first film of thermoplastic material fed onto the rotating drum, and a series of rollers at least certain of which are driven, spaced with respect to said forming drum, said series of rollers including means providing for heating a first film prior to its being fed onto said drum to a temperature above the melting point temperature of the second mentioned stratum of the film but below the melting point temperature of the first mentioned stratum and to a temperature adequate for permitting thermoforming of the first film, and a second series of rollers at least certain of which are driven, spaced from said first roller series and having means thereon capable of heating a second film of the thermoplastic stock material to a temperature which is below the melting point of the second mentioned stratum of the second film and to a maximum temperature approximating the mean temperature between the heat softening point and the Vicat softening point of said second mentioned stratum, and movable heated pressure means coacting with said first and said second series of rollers for pressurized application of the second film to the first film on said drum resulting in a bonding of the second film to the first film and sealing of the formed air cells, said pressure means being disposed closely adjacent to the terminal one of said first series of rollers and closely adjacent the point of application for the first film to the drum.

19. An apparatus in accordance with claim 18 wherein each of said rollers is coated with an anti-friction anti-adhesion material.

20. An apparatus in accordance with claim 18 including means thereon for rotatably mounting thereon supply rolls of the thermoplastic stock material.

21. An apparatus in accordance with claim 18 including means coacting with said drum for stripping produced air cell product therefrom.

22. An apparatus in accordance with claim 18 wherein said first series of rollers have heating means coacting therewith for heating the first film to a temperature of approximately 330° F. prior to application of the first film to said drum, and said second series of rollers have heating means coacting therewith for heating the second film to a maximum temperature of 190° F. prior to the application of the second film to the first embossed film on the drum, and wherein said pressure means embodies heating means capable of heating said pressure means to a maximum of 195° F. surface temperature.

23. An apparatus in accordance with claim 22 wherein said pressure means comprises a rotatable roller and includes fluid pressure means coacting with the last mentioned roller for urging the latter with predetermined pressure against said forming drum, with the lengthwise axis of said roller extending generally parallel to the lengthwise axis of said forming drum.

24. An apparatus in accordance with claim 18 including means for rotating said forming drum at a peripheral speed slightly greater than the peripheral speed of the rollers of said first and said second series.

25. An apparatus in accordance with claim 18 including means for applying liquid anti-static material to at least one of said films prior to its being applied to said forming drum.

26. An apparatus in accordance with claim 22 including further heated pressure means downstream from the first pressure means for further subsequent application of pressure to the first and second films on said drum.

27. An apparatus in accordance with claim 26 wherein said further pressure means includes a heated rotatable roller movably mounted so as to be movable toward and away from said forming drum, and fluid pressure actuating means coacting with the last mentioned roller for selectively moving the latter into and out of engaging coaction with said forming drum.

28. An apparatus in accordance with claim 27 wherein said heated rotatable roller is heatable to a maximum surface temperature of approximately 195° F. and conventionally to a surface temperature of approximately 185° F.

29. An apparatus in accordance with claim 23 wherein said fluid pressure means comprises a pair of air cylinders, each one of which at one end thereof is coupled to a respective end of the axle of said pressure roller, and with the other end of each cylinder being pivoted to the apparatus frame, said cylinders being operable to urge said pressure roller in line contact against said drum in a direction and in a common plane extending generally through the rotary axis of said pressure roller and the rotary axis of said drum.

30. An apparatus in accordance with claim 23 wherein said heating means of said first roller series is operable to heat the first film to approximately 330° F. prior to application of the first film to said forming drum, said second roller series embodying heating means operable to heat said second roller series to a surface temperature having an upper range of approximately 190° F., said rotatable pressure roller embodying heating means operable to heat said pressure roller to a surface temperature within the range of approximately 180°–195° F. maximum, and preferably to a surface temperature of approximately 185° F., said pressure means being operable to apply a pressure in a range of between approximately 3 pounds to 9 pounds per lineal inch, applied along generally line contact of said pressure roller with the second film at its application to the first film on said drum, said fluid pressure means being operable to urge said pressure roller in line contact against said drum in a common plane extending generally through the rotary axis of said pressure roller and the rotary axis of said drum, said apparatus being adapted for use with film wherein the low density, low melting point stratum thereof consists essentially of polyethylene possessing a melting point of approximately 230° F.

* * * * *

UNITED STATES PATENT AND TRADEMARK OFFICE
CERTIFICATE OF CORRECTION

PATENT NO. : 4,412,879
DATED : November 1, 1983
INVENTOR(S) : GARY W. OTTAVIANO

It is certified that error appears in the above-identified patent and that said Letters Patent are hereby corrected as shown below:

Column 6, line 58, delete "one" and insert --not--.

Signed and Sealed this

Seventeenth Day of January 1984

[SEAL]

Attest:

GERALD J. MOSSINGHOFF

Attesting Officer          Commissioner of Patents and Trademarks